(12) United States Patent
Tjoelker et al.

(10) Patent No.: US 7,451,630 B2
(45) Date of Patent: Nov. 18, 2008

(54) HEAT TREATMENT STRATEGICALLY STRENGTHENED DOOR BEAM

(75) Inventors: Todd W. J. Tjoelker, Grand Rapids, MI (US); John D. Bowman, Dorr, MI (US); Alessandro Libriani, Grand Rapids, MI (US); Joseph C. Kollaritsch, Rockford, MI (US)

(73) Assignee: Benteler Automotive Corporation, Auburn Hills, MI (US)

( * ) Notice: Subject to any disclaimer, the term of this patent is extended or adjusted under 35 U.S.C. 154(b) by 461 days.

(21) Appl. No.: 10/965,344

(22) Filed: Oct. 14, 2004

(65) Prior Publication Data

US 2005/0081479 A1     Apr. 21, 2005

(51) Int. Cl.
  B21D 37/16    (2006.01)
  H05B 6/10     (2006.01)
  H05B 6/22     (2006.01)

(52) U.S. Cl. .................. 72/342.5; 72/342.96; 72/342.6; 219/602; 219/632; 219/635; 219/659

(58) Field of Classification Search ......... 148/567–575; 72/342.1, 342.2, 342.5, 342.6, 342.94, 342.96, 72/31.03; 219/602, 603, 632, 635, 637, 639, 219/647, 659; 29/897.2, 897.3, 897.31
See application file for complete search history.

(56) References Cited

U.S. PATENT DOCUMENTS

| | | | |
|---|---|---|---|
| 1,433,161 A | 10/1922 | Smith et al. | |
| 1,526,894 A | 2/1925 | Bellis | |
| 1,594,322 A | 7/1926 | O'Donovan | |
| 1,843,200 A | 2/1932 | Brannon | |
| 2,003,094 A | 5/1935 | Shimer et al. | |
| 2,170,130 A | 8/1939 | Denneen et al. | |
| 2,170,876 A | 8/1939 | Shorter | |
| 2,196,902 A | 4/1940 | Jones | |
| 2,202,759 A | 5/1940 | Denneen et al. | |
| 2,243,174 A | 5/1941 | Stevenson | |
| 2,303,408 A | 12/1942 | Soderholm | |
| 2,419,619 A | 4/1947 | Wood | |
| 2,576,342 A | 11/1951 | Hess et al. | |
| 2,683,031 A | 7/1954 | Grönegress | |
| 2,831,788 A | 4/1958 | Bridge et al. | |
| 3,169,893 A | 2/1965 | Wuerfel | |
| 3,352,724 A | 11/1967 | McNitt et al. | |
| 3,460,815 A | 8/1969 | Corteggiano et al. | |

(Continued)

FOREIGN PATENT DOCUMENTS

| | | |
|---|---|---|
| JP | 4280924 A | 6/1992 |
| JP | 4263007 | 9/1992 |
| JP | 5148531 | 6/1993 |
| JP | 610302 | 1/1994 |

Primary Examiner—Derris H. Banks
Assistant Examiner—Teresa Bonk
(74) Attorney, Agent, or Firm—Price, Heneveld, Cooper, DeWitt & Litton, LLP

(57) ABSTRACT

A method of forming a vehicle component, particularly an elongated impact beam, having an open section structure, in a manner to provide predetermined strategically strengthened portions, comprising the steps of cold forming unhardened steel into a workpiece having mounting surfaces, selectively fixturing the mounting surfaces, static induction heating the workpiece with lengthwise surface eddy currents on selected portions, followed by quenching of the fixtured heated workpiece to form strengthened portions, and unfixturing the resulting component. Also disclosed is apparatus to accomplish this, and the resulting novel vehicle component.

15 Claims, 2 Drawing Sheets

U.S. PATENT DOCUMENTS

| | | | |
|---|---|---|---|
| 3,556,499 A * | 1/1971 | Hammon | 148/585 |
| 3,905,630 A | 9/1975 | Cantrell et al. | |
| 3,927,870 A | 12/1975 | Seulen et al. | |
| 3,972,744 A | 8/1976 | Cantrell et al. | |
| 4,010,969 A | 3/1977 | Cantrell et al. | |
| 4,043,847 A | 8/1977 | Just | |
| 4,062,701 A | 12/1977 | Juhas | |
| 4,093,839 A | 6/1978 | Moliterno et al. | |
| 4,142,923 A | 3/1979 | Satava | |
| 4,210,467 A | 7/1980 | Klatzer et al. | |
| 4,305,272 A | 12/1981 | Johnson | |
| 4,323,404 A | 4/1982 | Sawada et al. | |
| 4,468,010 A | 8/1984 | Novorsky | |
| 4,486,249 A | 12/1984 | Woodings | |
| 4,561,908 A | 12/1985 | Berchem | |
| 4,708,390 A | 11/1987 | Palentyn et al. | |
| 4,732,624 A | 3/1988 | Balzer | |
| 4,740,255 A | 4/1988 | Manton | |
| 4,796,946 A | 1/1989 | Wilson et al. | |
| 4,880,477 A | 11/1989 | Hayes et al. | |
| 4,919,473 A | 4/1990 | Laimighofer et al. | |
| 4,959,107 A | 9/1990 | Wallick, Jr. et al. | |
| 5,118,159 A | 6/1992 | Horling et al. | |
| 5,123,694 A | 6/1992 | DePierre et al. | |
| 5,180,204 A | 1/1993 | Shirasawa et al. | |
| 5,181,974 A | 1/1993 | Tanabe et al. | |
| 5,192,376 A | 3/1993 | Tanabe et al. | |
| 5,232,261 A | 8/1993 | Kuroda et al. | |
| 5,256,217 A | 10/1993 | Macheske | |
| 5,370,437 A | 12/1994 | Alberda | |
| 5,451,276 A | 9/1995 | Junius | |
| 5,473,960 A | 12/1995 | Sakamoto et al. | |
| 5,487,795 A | 1/1996 | Kim et al. | |
| 5,495,094 A | 2/1996 | Rowan et al. | |
| 5,570,558 A | 11/1996 | Persson | |
| 5,600,931 A | 2/1997 | Jonsson | |
| 5,672,216 A | 9/1997 | Robic | |
| 5,739,506 A | 4/1998 | Hanton et al. | |
| 5,755,486 A | 5/1998 | Wycech | |
| 5,756,167 A | 5/1998 | Tamura et al. | |
| 5,785,376 A | 7/1998 | Nees et al. | |
| 5,813,718 A | 9/1998 | Masuda et al. | |
| 5,813,719 A | 9/1998 | Kowalski | |
| 5,829,716 A * | 11/1998 | Kirkwood et al. | 244/117 R |
| 5,868,456 A | 2/1999 | Kowalski et al. | |
| 5,887,938 A | 3/1999 | Töpker et al. | |
| 5,972,134 A | 10/1999 | Buschsieweke et al. | |
| 6,227,609 B1 | 5/2001 | Mellis | |
| 6,322,645 B1 * | 11/2001 | Dykstra et al. | 148/570 |

* cited by examiner

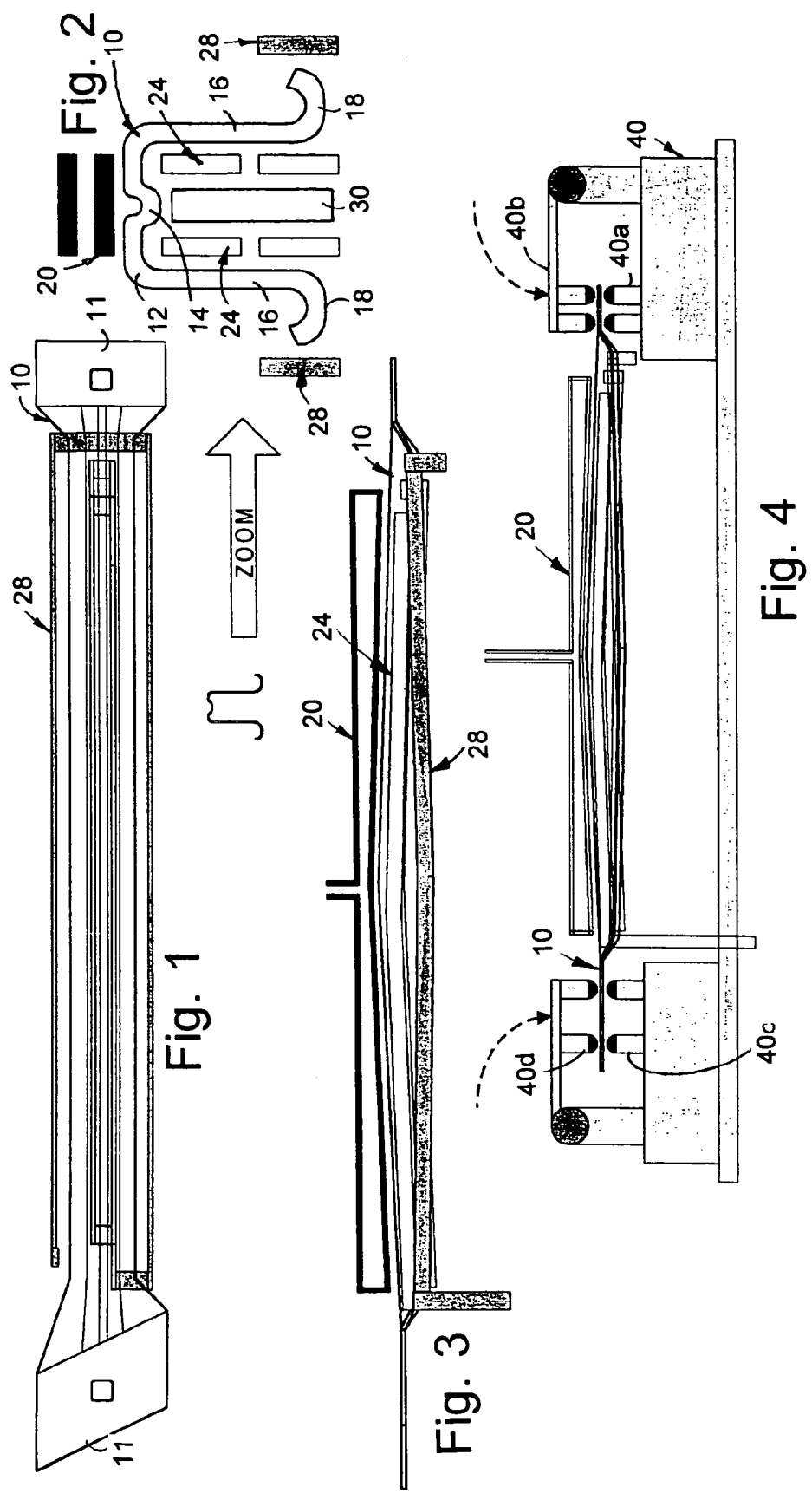

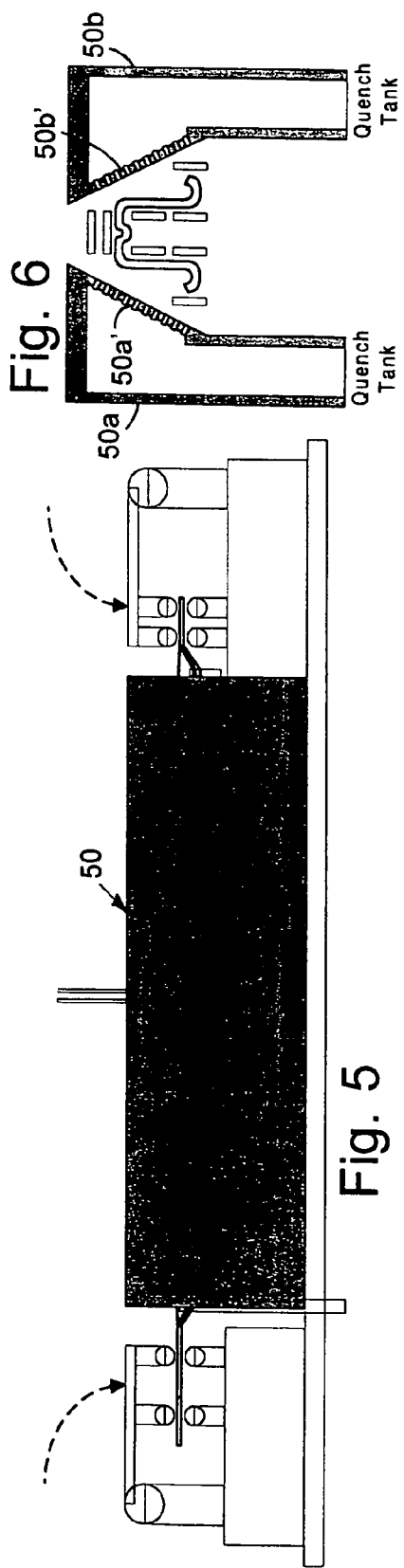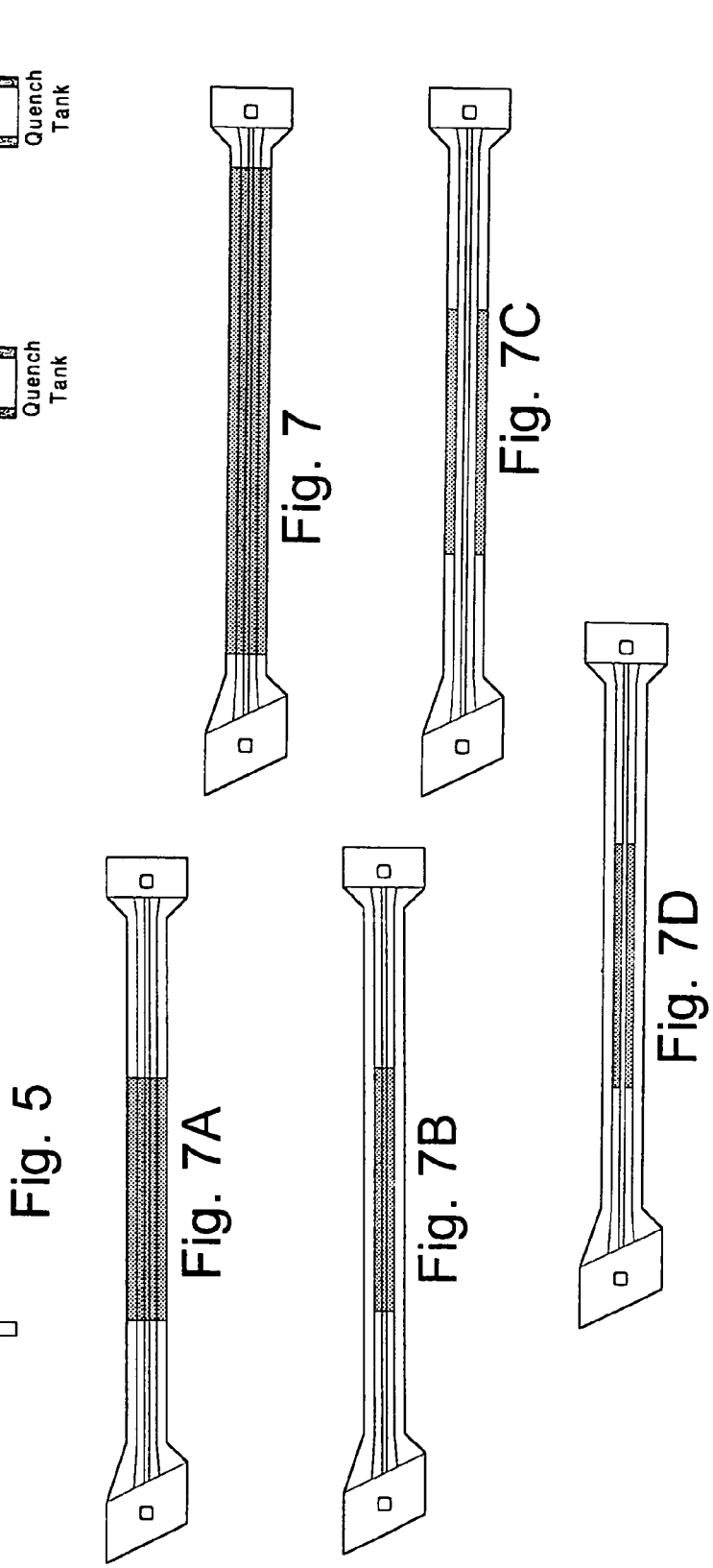

HEAT TREATMENT STRATEGICALLY STRENGTHENED DOOR BEAM

BACKGROUND OF THE INVENTION

This invention relates to strategically strengthened steel automotive members of open elongated structure, and is particularly suitable for strategically strengthened, open structure, automobile components, such as impact door beams used for crash energy management.

Automotive vehicles employ crash energy management impact beams for protection of passengers. A good share of these beams are of closed structure type, e.g., cylindrical or tubular, as in U.S. Pat. Nos. 5,370,437; 5,123,694; 5,118,159; and 4,708,390. Such tubular beams are normally of generally uniform wall thickness. Further, they do not have exposed edges because of their closed or tubular configuration. Therefore, they can be readily induction heat treated. These tubes can be formed of lower hardness steel and then heat treated. Heat treatment of such tubular impact beams can be achieved by induction simply by encircling successive portions of the beam with a heat treatment induction coil to heat the same, followed by quenching. Door beam tubes are sometimes made of special steel, as disclosed in U.S. Pat. No. 4,210,467, and then cut to length and provided with a desired end configuration.

As an alternative to this type of tubular impact beam structure, it is known to take flat steel, and form it into an open beam by cold stamping or rolling. There is a limit, however, to the hardness and strength of this type of final beam product, because the metal must not be so hard as to not be reliably formable by stamping or rolling. As another alternative, steel may be hot formed into the desired configuration, as disclosed in U.S. Pat. No. 5,972,134. However, this latter alternative is costly both in the per piece cost and the capital investment required.

Prior efforts to form open section type impact beams from low strength steel, and then heat treat the beam, have resulted in at least two imperfections which are not acceptable. First, if standard induction heating with encircling coils is used, the free or exposed edges of the beam tend to become overheated and burned, while the remainder of the cross section remains insufficiently heated. Second, the impact beam tends to become distorted as a result of the heating and subsequent quenching. Hence, such impact beams do not meet the required quality standards for easy and effective assembly in an automobile, or other vehicle. Furthermore, they do not have the required uniform strength characteristics that are required in many applications due to the uneven heating.

It would therefore be desirable to fabricate automobile components such as impact beams of open structure type from unhardened steel, and subsequently harden selected portions of the steel without the imperfections and drawbacks previously experienced in the prior art. Such an open structure impact beam would preferably have elongated side flanges along its length for added strength, but without the burned flange edges and/or excessively distorted beam structure experienced in the prior art, and with greater and more uniform strength.

SUMMARY OF THE INVENTION

One aspect of the present invention is a method of making an automobile component, especially a vehicle impact beam, of the open structure type, and preferably with strengthening flanges, by cold forming it from unhardened steel stock, and then induction heat treating the steel without burning or overheating the flanges, resulting in achieving ultra high tensile strengths of even up to about 238 ksi and yield strengths of about 191 ksi, which is an increase of about 6 percent in the tensile strength and about 15 percent in yield strength over those asserted for hot stamped beams. These are significant differences.

The impact beam is preferably formed of unhardened steel at ambient temperature, with a pair of strengthening side flanges, preferably curled, and a configured central area, preferably of hat-shaped cross-sectional configuration. The preferred hat-shaped area can be of single or multiple hat cross section. The unhardened steel can be readily cold formed by stamping or rolling as examples. The formed workpiece is then hardened in strategically predetermined areas over its length, by proximity coil induction heating while the beam is fixture restrained, the induction process creating eddy currents running the length of the selected areas of the beam rather than transversely of the length, i.e., lengthwise along the crown, the crown sidewalls and/or the flanges.

These and other features, advantages and aspects of the present invention will be further understood and appreciated by those skilled in the art by reference to the following specification, claims and appended drawings.

BRIEF DESCRIPTION OF THE DRAWINGS

FIG. 1 is a plan view of an impact door beam shown in combination with inner and outer portions of a lower proximity, usually static, induction coil;

FIG. 2 is a sectional view of the door beam in FIG. 1 in combination with an upper proximity, usually static, coil adjacent the crown of the door beam, inner proximity, usually static, lower coil turns adjacent the sidewalls of the crown, and lower outer proximity, usually static, coil turns adjacent the flanges of the door beam;

FIG. 3 is a side elevational view of the door beam and the upper and lower induction coils;

FIG. 4 is a side elevational view of the door beam, induction coils and fixture mechanism at the ends of the door beam;

FIG. 5 is a side elevational view of the door beam and fixture within a quench subassembly;

FIG. 6 is an end elevational view of the door beam, induction coils and quenching subassembly;

FIGS. 7 and 7A-7D show some examples of configurations and strengthening. Specifically:

FIG. 7 is a plan view of a final strategically strengthened door beam shown strengthened over its length except for the mounting end surfaces;

FIG. 7A is a plan view of a preferred embodiment of the strategically strengthened door beam, showing the strengthening portion to be only centrally of the door beam, encompassing the crown, the sidewalls and the flanges;

FIG. 7B is a plan view of a door beam strategically strengthened in the crown portion only;

FIG. 7C is a plan view of a similar door beam strategically strengthened in the flange portions only; and FIG. 7D illustrates a door beam strategically strengthened only in the portions of the crown straddling the central indentation or rib.

DETAILED DESCRIPTION OF PREFERRED EMBODIMENTS

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now specifically to the drawings, in FIGS. 1-4 is shown an automobile component, namely an impact beam 10, which in the illustrated example has a formed, cross-sectional structure or rigid body which is open, i.e., not tubular or closed, shown having a crown 12 with an elongated indentation 14 centrally thereof to form a rib, a pair of sidewalls 16 integral with the crown and also integral with a pair of outwardly extending flanges 18 which are preferably curled. Rib 14 and curled flanges 18 add strength to the impact beam. While a single crown is depicted, the present invention may incorporate multiple crowns. Therefore, when the term "crown" is used herein, it is intended to encompass both a single crown and multiple crowns unless stated otherwise.

Adjacent to but spaced above crown 12 is shown an elongated, proximity induction coil 20 having a lower turn and an upper turn, the lower turn being closely adjacent crown 12 but not in contact therewith, and the turns extending lengthwise of the crown and impact beam 10 over the desired preselected portion of the crown 12 to be strategically strengthened. This arrangement causes induced eddy currents to move in the primarily lengthwise axial direction of the workpiece.

It has been determined that the undesirable burned edge structure in prior art open channel impact beams is a result of the use of encircling induction coils for heat treatment. This is considered to be largely because the induced eddy currents at the surface of the open workpiece transverse to the workpiece axis reversed at the lateral edges of the flanges, creating the undesirable edge overheating. This overheating does not typically occur with enclosed or tubular types of impact beams, because the single direction transverse current flow on the closed section is generally uniform, provided the thickness of the tubular beam is primarily uniform.

In the illustrated example, adjacent and inside the walls 16 of impact beam 10 are shown multiple turns of an elongated proximity induction coil 24, wherein the turns extending lengthwise of the walls for induction heating of sidewalls 16 by currents moving lengthwise in axial direction of the workpiece. Adjacent to and straddling flanges 18 are turns of a lower, outer, elongated, proximity induction coil 28 extending lengthwise of the flanges to cause induction heating by eddy currents moving axially lengthwise of the flanges.

Each of the illustrated induction coils 20, 24 and 28 is connected to a conventional electrical power source (not shown). Also, each is normally hollow for allowing coolant to flow through the coil. The turns of the induction heater elements are normally ceramic coated for electrical protection.

Preferably, conventional flux concentrators are utilized for optimum efficiency of the coils. Specifically, the upper surface of the lower turn of coil 20 has a layer of flux concentrator. Also, an elongated flux concentrator element 30 is positioned centrally of inner coil 24. Finally, the outer surfaces of coil 28 adjacent flanges 18 can have a layer of flux concentrator.

Coil 24 extends over the length of those portions of walls 16 which are to be strategically strengthened. Coil 28 extends over the length of those portions of the flanges 18 which are to be strategically strengthened. Since the impact beam 10 has a configuration which slopes toward the ends, such as in FIG. 3, upper coil 20 will have its lower turn tapered in like fashion, so as to be closely adjacent to but out of contact with impact beam 10. Similarly, inner coil 24 will have a configuration generally matching that of walls 16.

The beam blank or workpiece is initially forcefully cold formed at substantially ambient temperature from non-hardened steel, such as by stamping and/or rolling techniques of conventional type, into the desired configuration. A suitable material for the workpiece is a hardenable steel, i.e., quenchable steel. The two axial ends 11 can be formed into the flattened paddle shape shown in FIG. 1, or alternatively can be a combination of paddle and flanged end, respectively, on opposite ends, or even a pair of flange ends, all of which are capable of serving as mounting surfaces. Preferably the beam is of one piece, but alternatively the ends can be formed separately and attached to the main portion of the impact beam.

In the illustrated example, prior to the heat treatment, the cold formed beam workpiece is shown fixtured in a suitable clamping device, preferably by having both ends clamped securely in a fixture, as shown in FIG. 4. This elongated fixture 40 is shown to include a lower clamp element 40a and an upper clamp element 40b on one end. The upper clamp element 40b may be rotatable on an axis to securely engage one end of the impact beam workpiece against the lower clamp element 40a. The opposite end of the fixture 40 includes a lower clamp element 40c and an upper clamp element 40d, wherein the upper clamp element 40d is also rotatable to engage the second end of the beam against the lower clamp element 40c. Preferably one pair of these clamping elements 40a and 40b and 40c and 40d allows the respective flange to move only longitudinally, but not vertically or torsionally, to accommodate beam expansion and contraction due to temperature increases and decreases during the induction heat treating process, but prevent significant vertical or torsional distortion. Alternatively, both ends of the fixture 40 may allow longitudinal movement without permitting significant vertical or torsional movement. The fixture ends need not be rotatable, but rather simply movable to restrain or release the impact beam, e.g., normal to the beam axis. As a further alternative, the fixture 40 can clamp the center portions of the impact beam rather than the ends.

Once the impact beam workpiece is fixtured, electrical power is supplied to the elongated coil or coils extending along the workpiece. The drawings show three coils, but these may alternatively be multiple turns of one coil, two coils or some other number of coils. As here shown, upper coil 20, central coil 24 and/or lower outer coil 28 cause eddy currents to be created lengthwise of the adjacent impact beam portions, and thereby significantly increase the temperature of the impact beam portions to a desired predetermined value and for a desired predetermined time to obtain appropriate metallurgical changes. Experimentation showed that use of a pulser to selectively interrupt activation of the coils creates pulse heating with lapsed time after pulses for conduction disperses the heat uniformly, which is advantageous in achieving uniform heat throughout the selected cross section. Typical pulse/conduction heating is a 100 Kw, 30 Hz induction pulse of about five seconds at 50 percent power, followed by a one second lapse for conductance, repeated as necessary until the target section is sufficiently heated. These power and time factors will vary with the specific item being treated. Preferably the length of all three portions of the hat-shaped beam, i.e., crown 12, walls 16 and flanges 18, is heated lengthwise thereof by eddy currents moving lengthwise of the beam. When the appropriate preselected temperature is reached for the time necessary, the coils are deactivated, a pair of quench tank units 50a and 50b of a quench subassembly 50 is moved adjacent to and astraddle of the door beam, and coolant is then rapidly and suddenly applied through nozzles 50a' and 50b' directed onto the impact beam 10 to quench the same while it is still fixtured or retained in fixture 40, and thereby reduce the temperature of impact beam 10 to create the desired hardening effect. If the induction coils interfere with the quenching apparatus, the coils may be moved before the quenching step.

The resulting impact beams 10 have significantly increased tensile and yield strengths compared to the known prior art hot stamped beams. This enables a lighter weight beam to be employed, thereby reducing manufacturing costs and improving vehicle efficiency. It has been found that by utilizing the concept and method herein, ultra high strengths of even about 238 ksi tensile strength and about 191 ksi yield strength can be achieved in the strategically strengthened portions of the open structure impact beam. These are substantially above the 226 ksi tensile strength and 167 ksi yield strength of the prior art hot stamped products. This is highly desirable.

FIGS. 7 and 7A-7D illustrate several possible single crown impact beams strengthened in selected zones as noted previously. The single crown configuration of each can be of multiple crown configuration.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An apparatus for making vehicle impact beams of the type having a predetermined open section configuration, comprising:

means for cold forming an unhardened blank of hardenable steel at substantially ambient temperature into an elongated vehicle impact beam having opposite ends, and an elongated open section therebetween having an offset lateral cross-sectional configuration with a center portion and a pair of elongated flanges extending along opposite sides of the center portion which collectively define the predetermined open section configuration;

an elongated induction heater having longitudinally extending coils positioned adjacent to and extending along at least selected portions of at least one of the center portion and the flanges of the vehicle impact beam, which when activated, heats the selected portions of the vehicle impact beam with eddy currents that move lengthwise along the surfaces of the selected portions of the vehicle impact beam to a temperature sufficient to heat treat the hardenable steel of the vehicle impact beam;

a quencher rapidly cooling the heated selected portions of the one of the center portion and the flanges of the vehicle impact beam to selectively harden and strengthen the same; and first and second clamping fixtures spaced longitudinally apart adjacent the opposite ends of the vehicle impact beam, and including first and second clamping members which converge to securely retain therebetween the opposite ends of the vehicle impact beam and prevent the vehicle impact beam from shifting either torsionally or laterally from said predetermined open section configuration during activation of said induction heater and said quencher; at least one of said first and second clamping fixtures being configured to permit at least one of the clamped ends of the vehicle impact beam to shift longitudinally between said first and second clamping members, while preventing torsional and lateral shifting of the vehicle impact beam to accommodate for thermal expansion and contraction of the vehicle impact beam during activation of said induction heater and said quencher.

2. An apparatus as set forth in claim 1, wherein:
said induction heater includes a first enlongated induction heater coil disposed adjacent to and between interior surfaces of the center portion and flanges of the vehicle impact beam, and extending along a predetermined portion thereof.

3. An apparatus as set forth in claim 2, wherein:
said induction heater portion includes a second elongated induction heater coil disposed adjacent an exterior surface of the center portion of the vehicle impact beam, and extending along a predetermined portion thereof.

4. An apparatus as set forth in claim 3, wherein:
said induction heater includes a third elongated induction heater coil disposed adjacent an exterior surface of a first one of the flanges, and extending along a predetermined portion thereof.

5. An apparatus as set forth in claim 4, wherein:
said induction heater includes a fourth elongated induction heater coil disposed adjacent an exterior surface of a second one of the flanges, and extending along a predetermined portion thereof.

6. An apparatus as set forth in claim 5, wherein:
said first elongated induction heater coil includes first and second laterally spaced apart portions; and including
a concentrator element positioned between the first and second portions of said first enlongated induction heater coil.

7. An apparatus as set forth in claim 6, wherein:
said first elongated induction heater coil is tapered longitudinally to remain closely adjacent to but out of contact with the vehicle impact beam.

8. An apparatus as set forth in claim 7, wherein:
said induction heater includes a pulser to create substantially uniform heating of the selected portions of the vehicle impact beam.

9. An apparatus as set forth in claim 1, wherein:
said induction heater includes an elongated induction heater coil disposed adjacent to and between interior surfaces of the center portion and flanges of the vehicle impact beam, and extending along a predetermined portion thereof.

10. An apparatus as set forth in claim 1, wherein:
said induction heater includes an induction heater coil disposed adjacent an exterior surface of the center portion of the vehicle impact beam, and extending along a predetermined portion thereof.

11. An apparatus as set forth in claim 1, wherein:
said induction heater includes an induction heater coil disposed adjacent an exterior surface of a first one of the flanges, and extending along a predetermined portion thereof.

12. An apparatus as set forth in claim 1, wherein:
said induction heater includes an induction heater coil disposed adjacent an exterior surface of a second one of the flanges, and extending along a predetermined portion thereof.

13. An apparatus as set forth in claim 1, wherein:
said longitudinally extending coils are tapered longitudinally to remain closely adjacent to but out of contact with the vehicle impact beam.

14. An apparatus as set forth in claim 1, wherein:

said induction heater includes a pulser to create substantially uniform heating of the selected portions of the vehicle impact beam.

15. An apparatus as set forth in claim 1, wherein:

said first and second clamping fixtures are each configured to permit the clamped ends of the vehicle impact beam to shift longitudinally between said first and second clamping members, while preventing torsional and lateral shifting of the vehicle impact beam to accommodate for thermal expansion and contraction of the vehicle impact beam during activation of said induction heater and said quencher.

* * * * *